(12) United States Patent
Hartnell

(10) Patent No.: US 9,241,545 B2
(45) Date of Patent: Jan. 26, 2016

(54) BUCKLE ASSEMBLY

(71) Applicant: Martin-Baker Aircraft Co. Ltd., Middlesex (GB)

(72) Inventor: Graham Hartnell, Middlesex (GB)

(73) Assignee: Martin-Baker Aircraft Co. Ltd., Middlesex (GB)

( * ) Notice: Subject to any disclaimer, the term of this patent is extended or adjusted under 35 U.S.C. 154(b) by 214 days.

(21) Appl. No.: 13/932,416

(22) Filed: Jul. 1, 2013

(65) Prior Publication Data

US 2014/0007388 A1 Jan. 9, 2014

(30) Foreign Application Priority Data

Jul. 5, 2012 (GB) .................................. 1211985.5

(51) Int. Cl.
*B64D 11/06* (2006.01)
*A44B 11/25* (2006.01)

(52) U.S. Cl.
CPC ......... *A44B 11/2542* (2013.01); *A44B 11/2511* (2013.01); *B64D 11/062* (2014.12); *Y10T 24/45623* (2015.01)

(58) Field of Classification Search
CPC ...... B64D 11/062; B64D 17/32; B64D 25/06; B64D 25/10; A44B 11/2542; A44B 11/2519; A44B 11/2515; A44B 11/2511; Y10T 24/45654; Y10T 24/45723
See application file for complete search history.

(56) References Cited

U.S. PATENT DOCUMENTS

| | | | | | |
|---|---|---|---|---|---|
| 3,617,019 | A | * | 11/1971 | Femia | 24/631 |
| 4,813,111 | A | * | 3/1989 | Nohren | 24/632 |
| 2007/0266746 | A1 | * | 11/2007 | Yu | 70/69 |

FOREIGN PATENT DOCUMENTS

| | | | |
|---|---|---|---|
| DE | 4128773 C1 | * | 1/1993 |
| EP | 0200630 A2 | | 10/1986 |
| EP | 206924 A1 | * | 12/1986 |
| GB | 1022078 A | * | 3/1966 |

* cited by examiner

*Primary Examiner* — Tien Dinh
*Assistant Examiner* — Richard R Green
(74) *Attorney, Agent, or Firm* — Del Vecchio and Stadler LLP

(57) ABSTRACT

A buckle assembly comprising:
  a socket arrangement for releasably retaining a lug; and
  an operating handle rotatably mounted with respect to the socket arrangement and configured such that, upon rotation, the lug is released from the socket arrangement,
  the operating handle comprising first and second buttons diametrically opposed from one another, configured such that rotation of the operating handle with respect to the socket arrangement is prevented unless both the first and second buttons are simultaneously depressed.

15 Claims, 11 Drawing Sheets

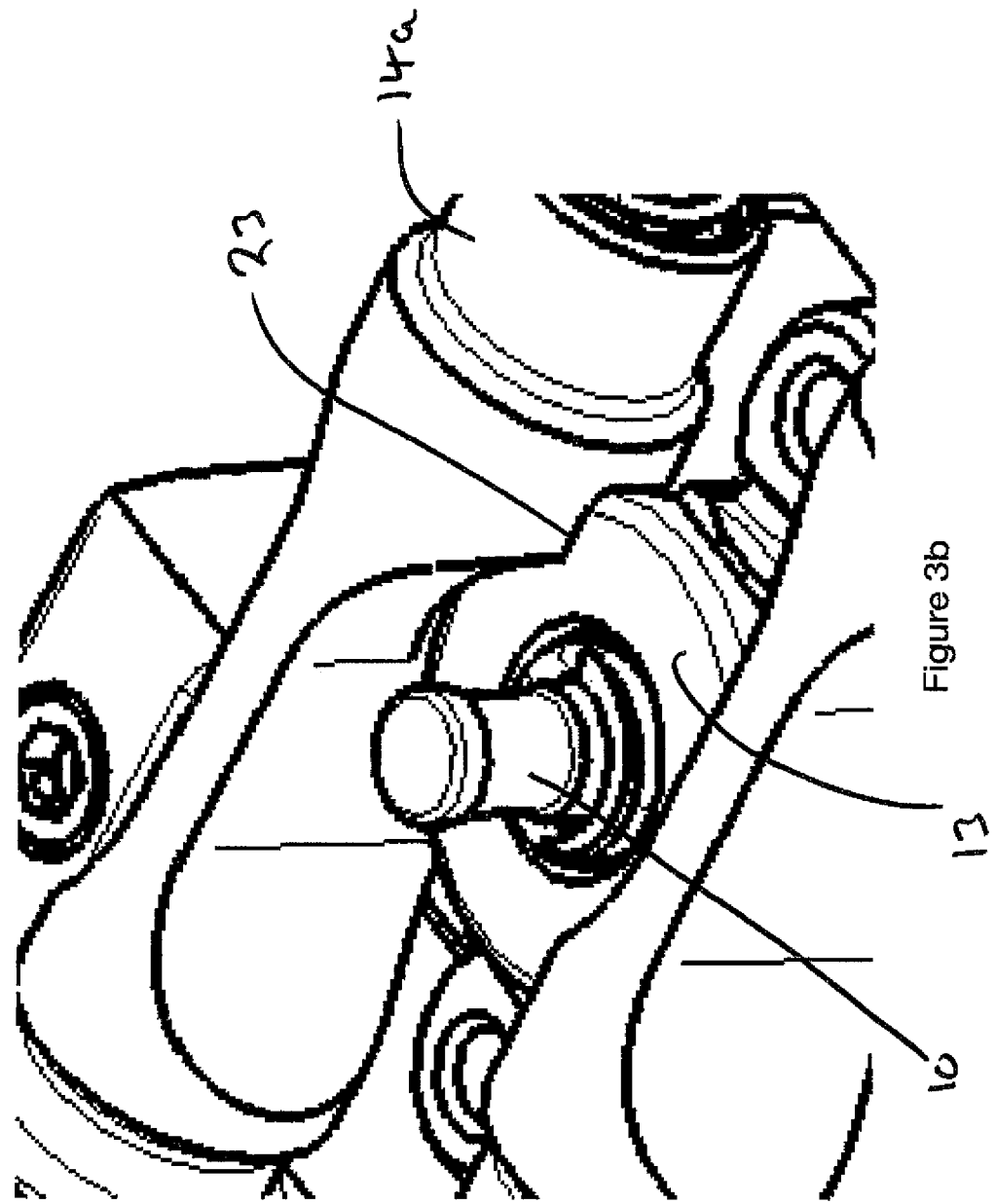

BUCKLE ASSEMBLY

CROSS REFERENCE TO RELATED APPLICATION

This application claims priority to British patent application GB 1211985.5 filed on Jul. 5, 2012 the entire content and disclosure of which is hereby incorporated herein by reference.

DESCRIPTION OF INVENTION

The present invention relates to a buckle assembly and a method of releasing a lug from a socket arrangement of a buckle assembly. The present invention also relates to a harness arrangement comprising the buckle assembly of the invention and an ejection seat having the harness arrangement.

It is known to secure two webbing straps together by the use of a buckle assembly. A socket arrangement of the buckle assembly is secured to one webbing strap and a lug is attached to the other webbing strap. The lug is releasably retained in the socket arrangement. The lug is released from the socket arrangement in response to a user operating a button, switch, lever or other user-operated input.

Such buckle assemblies are widely used in harness arrangements in aircraft. When a pilot enters the cockpit and positions himself in an ejection seat, he must separately secure himself to the ejection seat and to the parachute in the ejection seat. Attachment to the ejection seat is normally by means of a multi-point harness having a central multi-point connection block. Separately, the pilot must attach a separate body harness to two tethers of the parachute, which are arranged at the head of the ejection seat.

When the pilot is entering and exiting the cockpit, he must attach/detach himself from both the seat harness and the parachute tethers.

It is necessary for a buckle assembly to allow easy attachment and detachment of the socket arrangement and lug. At the same time, operation of the buckle assembly must be reliable and ensure secure retention of the lug in the socket arrangement when desired. A positive feedback to the user when the lug is secured in the socket arrangement is also beneficial.

Any inadvertent, undesired, release of the lug from the socket arrangement should be avoided. The lug must only be released from the socket arrangement when required by the user, in response to a deliberate action by the user.

Particularly when used in military aircraft, there is also a requirement for the buckle assembly to be operable by a pilot wearing gloves.

Aircraft, particularly military aircraft, in which a buckle assembly is installed will often be subject to high acceleration in a particular direction—so called "g-force". There is a need for a buckle assembly not to be adversely affected by such acceleration forces, to avoid inadvertent release of the buckle assembly and/or an adverse affect the operation of the buckle assembly when required.

The present invention seeks to provide an improved buckle assembly.

Accordingly, one aspect of the present invention provides a buckle assembly comprising: a socket arrangement for releasably retaining at least one lug; and an operating handle rotatably mounted with respect to the socket arrangement and configured such that, upon rotation, the lug is released from the socket arrangement, the operating handle comprising first and second buttons diametrically opposed from one another, configured such that rotation of the operating handle with respect to the socket arrangement is prevented unless both the first and second buttons are simultaneously depressed.

The present invention further provides a harness arrangement comprising at least one buckle assembly embodying the present invention. Furthermore, the present invention provides an ejection seat having a harness arrangement embodying the present invention.

Another aspect of the present invention provides a method of releasing at least one lug from a socket arrangement, comprising: providing an operating handle rotatably mounted with respect to the socket arrangement and having first and second buttons diametrically opposed from one another, and simultaneously depressing the first and second buttons and rotating the operating handle with respect to the socket arrangement.

The present invention further provides a buckle assembly, harness arrangement, ejection seat and method according to the appended claims.

Embodiments of the present invention will now be described, by way of non-limiting example only, with reference to the figures, in which:

FIG. 3b is an enlarged view of part of FIG. 3a;

FIG. 6b shows a cross-sectional view of the arrangement of FIG. 6a; and

Figure 1:
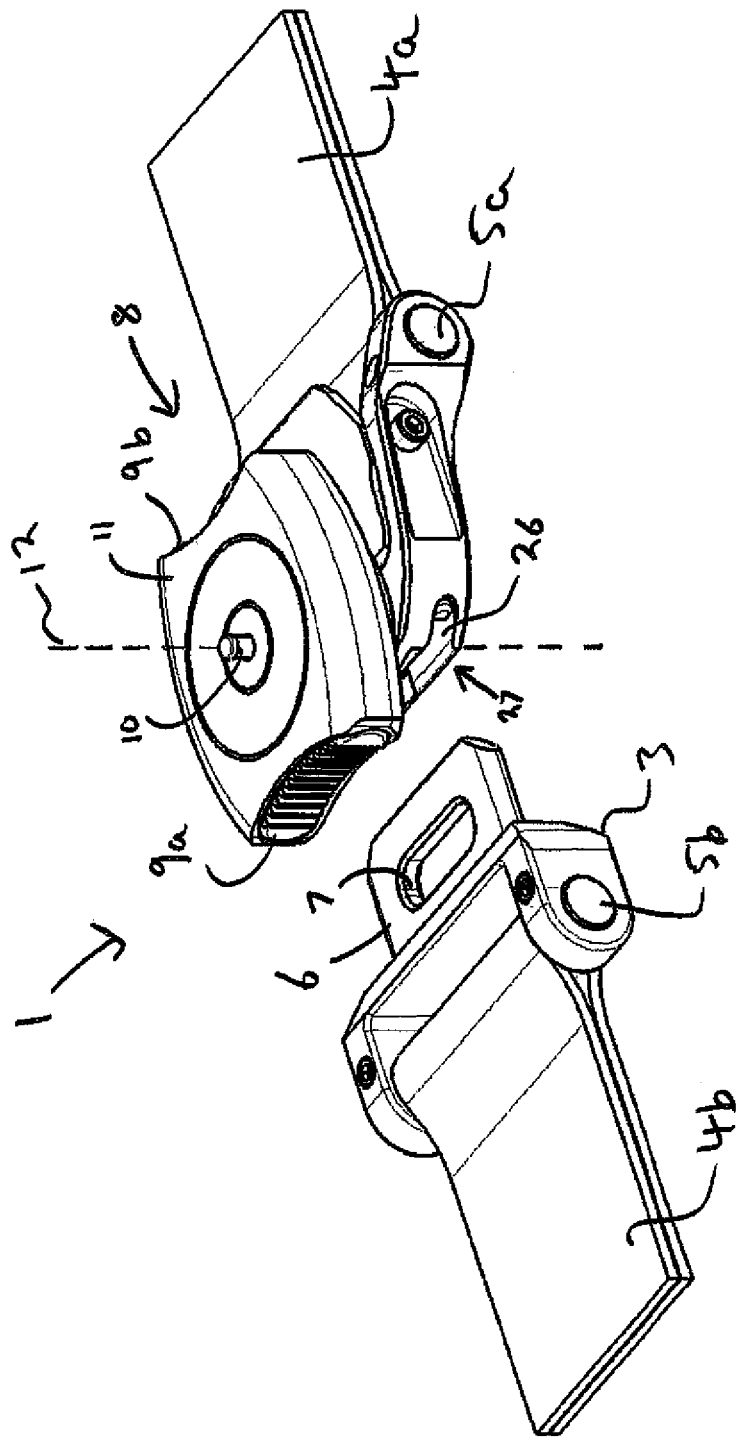
FIG. 1 shows a buckle assembly embodying the present invention disconnected from a lug.

FIG. 1 shows a buckle assembly 1 having a socket arrangement 2 for releasably retaining a lug 3. The socket arrangement 2 is connected to a webbing strap 4a using a conventional crossbar 5a. Likewise, the lug 3 is attached to another webbing strap 4b using a conventional crossbar 5b. The lug 3 comprises a tongue 6 having an aperture 7. The tongue 6 is receivable in the socket arrangement 2.

The buckle assembly 1 further comprises an operating handle 8 rotatably mounted with respect to the socket arrangement 2. As will be described in more detail below, upon rotation of the operating handle 8 with respect to the socket arrangement 2, the lug 3 is released from the socket arrangement 2.

The operating handle 8 comprises first 9a and second 9b push buttons diametrically opposed from one another. The operating handle 8 is configured such that rotation of the operating handle 8 with respect to the socket arrangement 2 is prevented unless both the first 9a and second 9b buttons are simultaneously depressed.

The operating handle 8 further comprises an indicator 10 which protrudes from the top surface of the housing 11 of the operating handle 8 when the lug 3 is not securely retained within the socket arrangement 2. The cylindrical outer surface of the indicator 10 is preferably highly visible (e.g. fluorescent). When the lug 3 is securely retained with the socket arrangement 2, the indicator 10 does not protrude from the housing 11 of the operating handle 8. The top surface of the indicator 10 is flush with the top surface of the housing 11.

The operating handle 8 is rotatable about an axis 12 which is perpendicular to the general plane of the operating handle 8. The indicator 10 is co-axial with the rotational axis 12. The first 9a and second 9b buttons are diametrically opposed with respect to the rotational axis 12 of the operating handle 8.

Insertion of the lug 3 into the socket arrangement 2 causes a locking plunger 13, as will be described below, to engage with the aperture 7 in the tongue 6 of the lug 3. The engagement of the locking plunger 13 with the lug 3 causes the indicator 10 to descend into the operating handle 8 and for the first 9a and second 9b buttons to protrude from the operating handle 8. In the arrangement shown in FIG. 2, the lug 3 is securely yet releasably retained in the socket arrangement 2.

Figure 7:
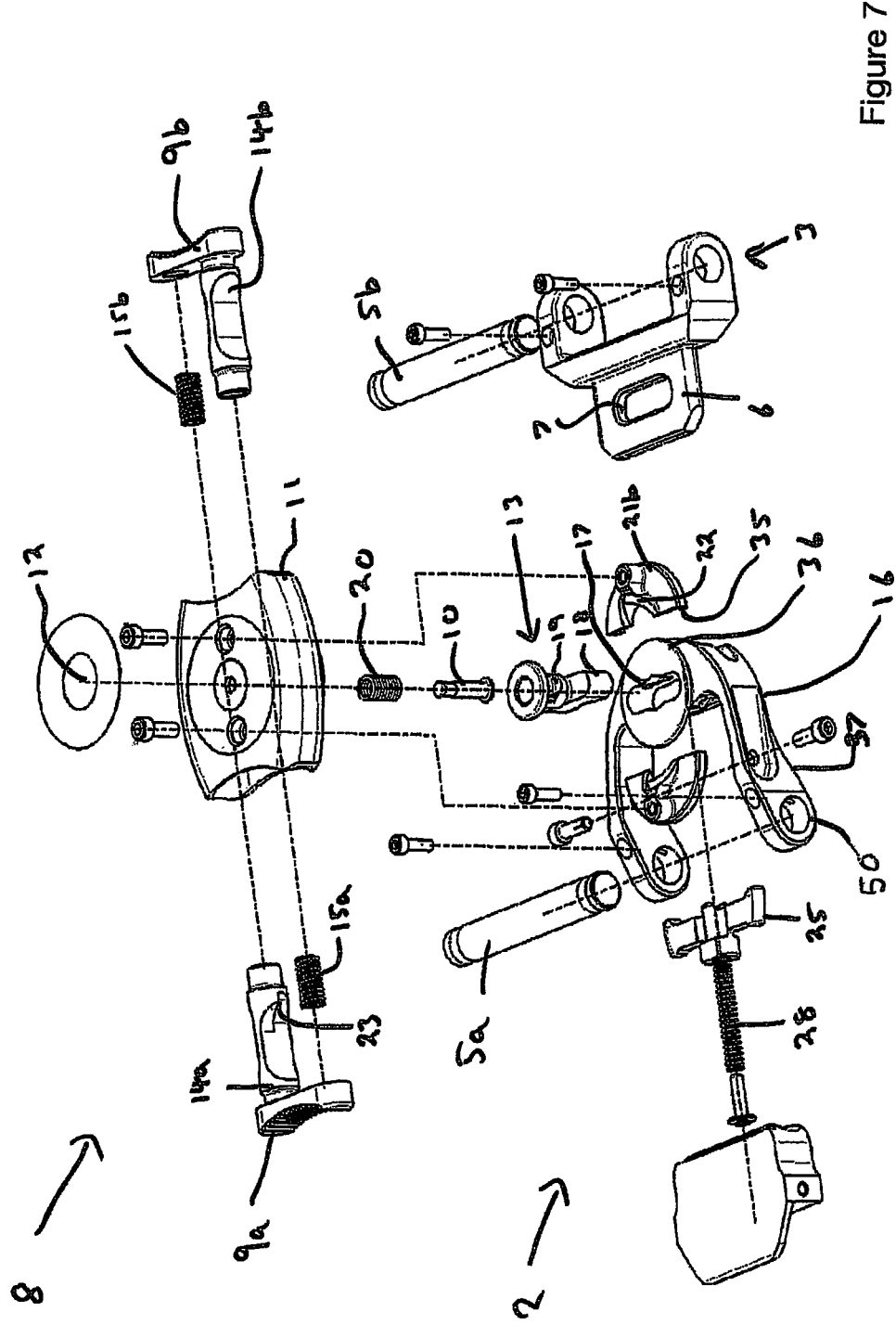
FIG. 7 shows an exploded view of a buckle assembly embodying the present invention.

With reference to FIGS. 3 and 7, each of the first 9a and second 9b buttons of the button assembly is attached to a respective blocking member 14, described in more detail below. A button spring 15 is provided between the distal end of the blocking member 14 and the rear side of the other of the first 9a and second 9b buttons. Accordingly, the springs 15 respectively bias the first 9a and second 9b buttons away from each other and thus away from the rotational axis 12 of the operating handle 8. The first 9a and second 9b buttons are independently translatable with respect to one another. The first 9a and second 9b buttons can only move towards the rotational axis 12 following a deliberate 'pinching' motion by the user's fingers with both the first 9a and second 9b buttons. The first 9a and second 9b buttons are mounted for linear translation along a plane which is substantially perpendicular to the axis of rotation 12.

The first 9a and second 9b buttons are substantially identical to one another and are arranged such that the centre of gravity of the combined button assembly lies along the axis of rotation 12. A particular benefit of this is that the first 9a and second 9b buttons will not be inadvertently triggered by the application of an excessive acceleration force (G-force) in a particular direction. Even if the acceleration experienced by the assembly was such that it created a force in one of the first 9a and second 9b buttons to overcome the biasing force of the button spring 15, it would not inadvertently cause the other of the first 9a and second 9b buttons to translate. Preferably, the mass of the first 9a and second 9b buttons is low, such that no anticipated acceleration force would be able to impart a force which would overcome the button spring bias.

Preferably, the centre of gravity of the operating handle 8, including the first and second buttons 9a. 9b, also lies along the axis of rotation 12.

Figure 2:
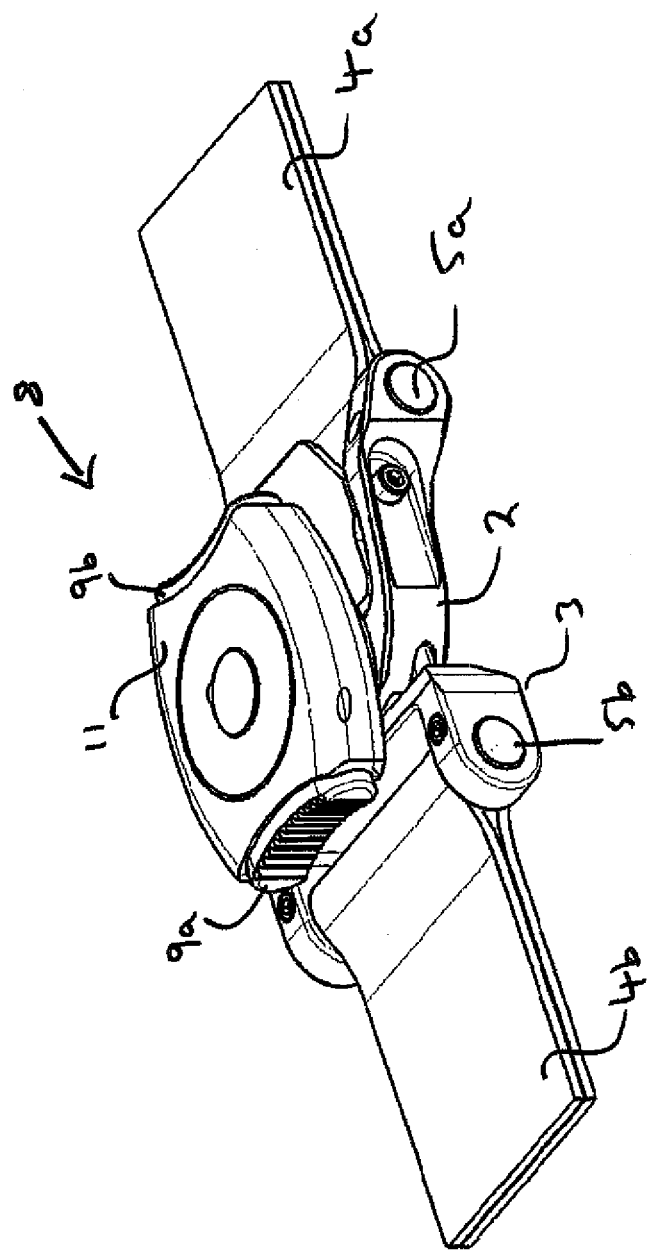
FIG. 2 shows a buckle assembly embodying the present invention releasably retaining a lug.

When the first 9a and second 9b buttons are biased away from each other by the button springs 15 (as shown in FIG. 2), at least a part of the button 9 assembly protrudes from the housing 11 of the operating handle 8. When the first 9a and second 9b buttons are depressed (FIG. 1), against the biasing force of the button springs 15, the finger contact surface of the first 9a and second 9b buttons is substantially flush with the opening in the housing 11 of the operating handle 8. In one embodiment, when the buttons 9a, 9b are fully depressed, the finger contact surface is behind the opening of the housing 11. This serves to further reduce the chance of inadvertent operation of the buckle assembly 1, for example by a strap wrapped around the arrangement or another object impacting the assembly. Preferably, the arrangement is configured such that only the user's fingers can depress the buttons 9 to operate the buckle assembly 1.

With reference to FIG. 7, the socket arrangement 2 comprises an armature 16 having two side arms 37. An aperture 50 is provided at the end of each of the two side arms 37, through which the crossbar 5a is inserted to secure the webbing strap 4a (see FIG. 1).

The main part of the armature 16 further comprises a locking channel 17 which receives the locking plunger 13 and restrains the locking plunger 13 to translational movement, along the axis of rotation 12. The locking channel 17 and the locking plunger 13 are configured to prevent rotation of the locking plunger 13 within the locking channel 17.

The lower half of the locking plunger 13 comprises a locking bolt 18 which is sized so as to engage with the aperture 7 in the lug 3. The upper part of the locking plunger 13 is provided with a pair of diametrically opposed cam followers 19 and a recess within which to receive the indicator 10 and a locking spring 20.

When assembled, the indicator 10 is inserted into the recess of the locking plunger 13, and the locking spring 20 positioned over and around the indicator 10. The lower end of the locking spring 20 contacts a flange at the base of the indicator 10 and the upper end of the locking spring 20 engages against the inside surface of the housing 11 of the operating handle 8. Accordingly, the locking spring 20 serves to urge the locking plunger 13 away from the operating handle 8, in use. The locking spring 20 is allowed to rotate with respect to the operating handle 8 and/or the locking plunger 13 (and indicator 10).

Rotation of the operating handle 8 with respect to the socket arrangement 2 accordingly affords relative rotation between the operating handle 8 and locking plunger 13.

As shown in FIG. 4, the operating handle 8 further comprises a pair of cam plates 21a, 21b which are secured via screws to the housing 11 of the operating handle 8. Each cam plate 21 is substantially semi-circular. When assembled, the two cam plates 21a, 21b collectively define a circular cam disc. Each cam plate 21a, 21b comprises a lip 35 which engages with a flange 36 provided on the armature 16. The lip bears against the flange to constrain the cam plates 21a, 21b (and thus the operating handle 8) to rotational movement with respect to the armature (and thus the socket arrangement 2).

Figure 4A:
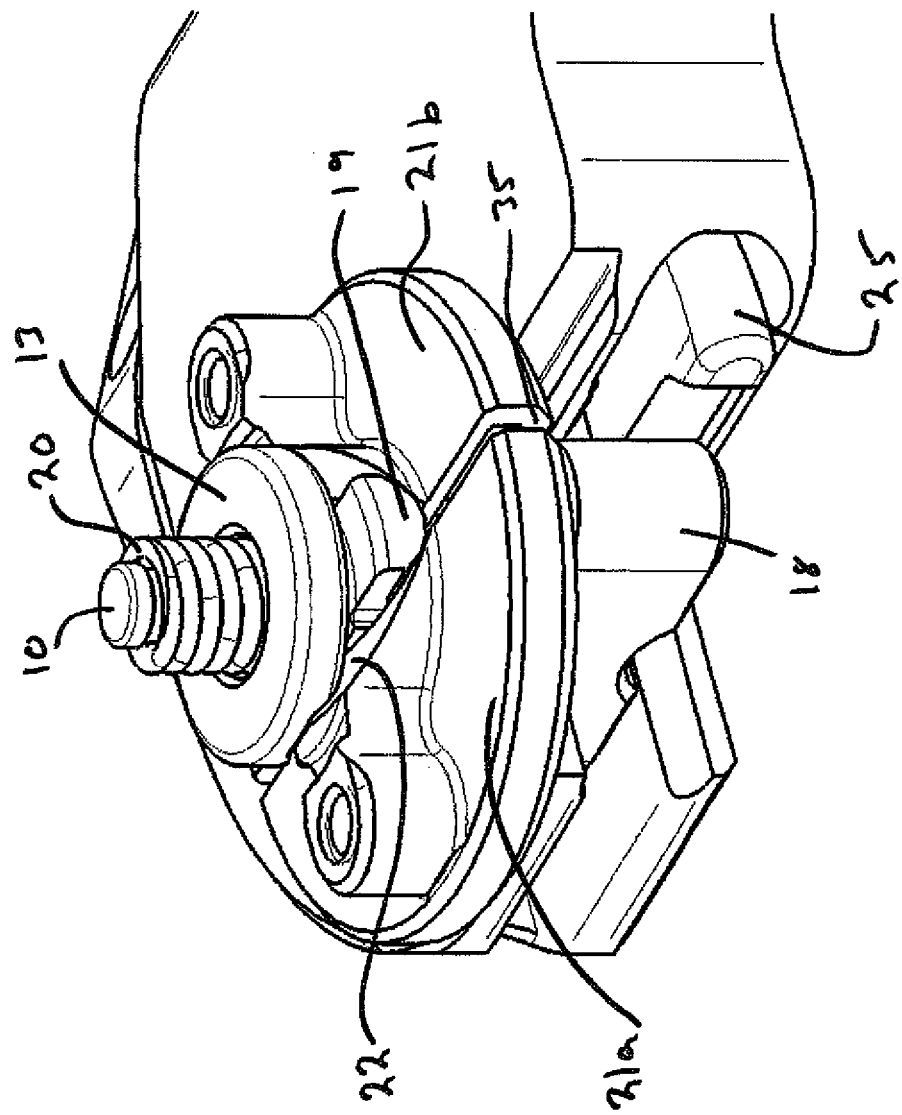
FIG. 4a shows the locking plunger and cam plate assembly in an engaged configuration.

The cam plates 21a, 21b each comprise a ramped cam surface 22, as shown in FIGS. 4 and 7. The cam followers 19 of the locking plunger 13 are urged into engagement with the cam surface 22 of the cam plates 21a, 21b by locking spring 20. In the engaged configuration shown in FIG. 4a, the cam followers 19 are resting at the lowest point of the cam surface 22 of the cam plates 21a, 21b. In this arrangement, the locking plunger 13 is urged to its furthest distance away from the operating handle 8, such that the locking bolt 18 engages with the aperture 7 of the lug 3, and thus retains the lug 3 within the socket arrangement 2.

Figure 4B:
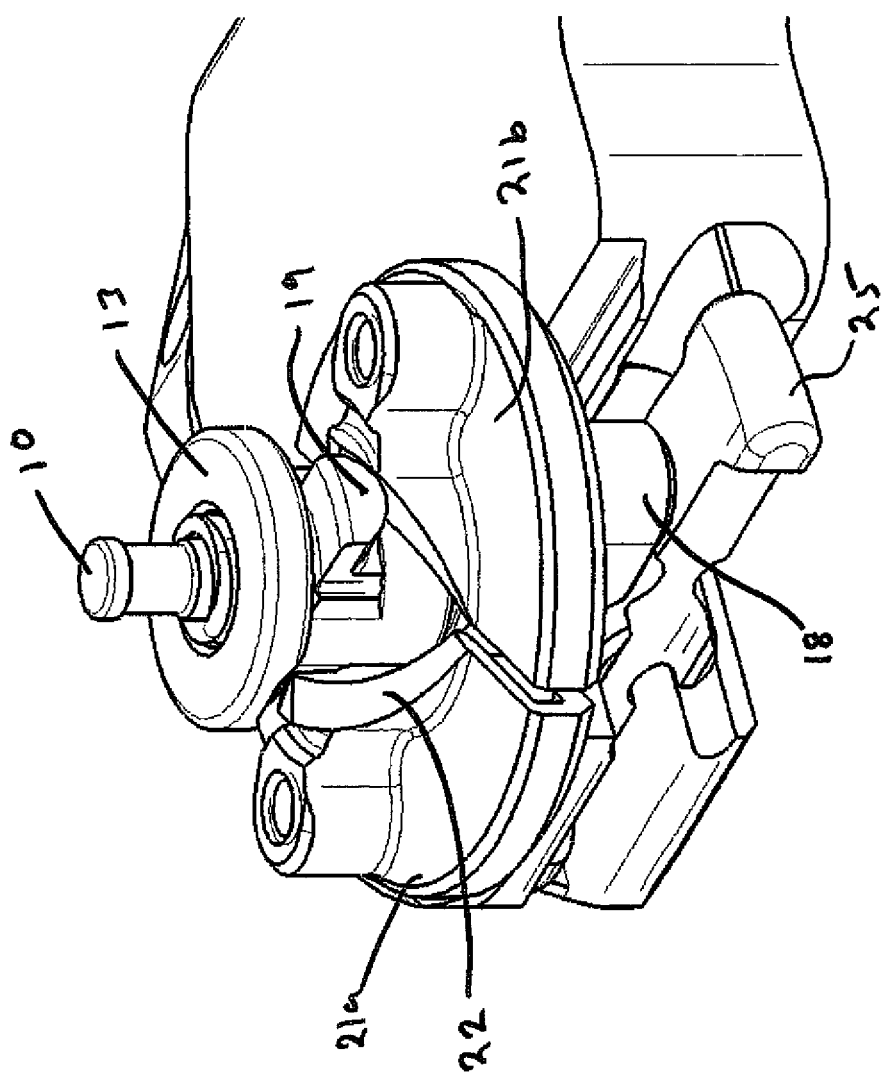
FIG. 4b shows the locking plunger and cam plate assembly in a disengaged configuration.
Figure 6A:
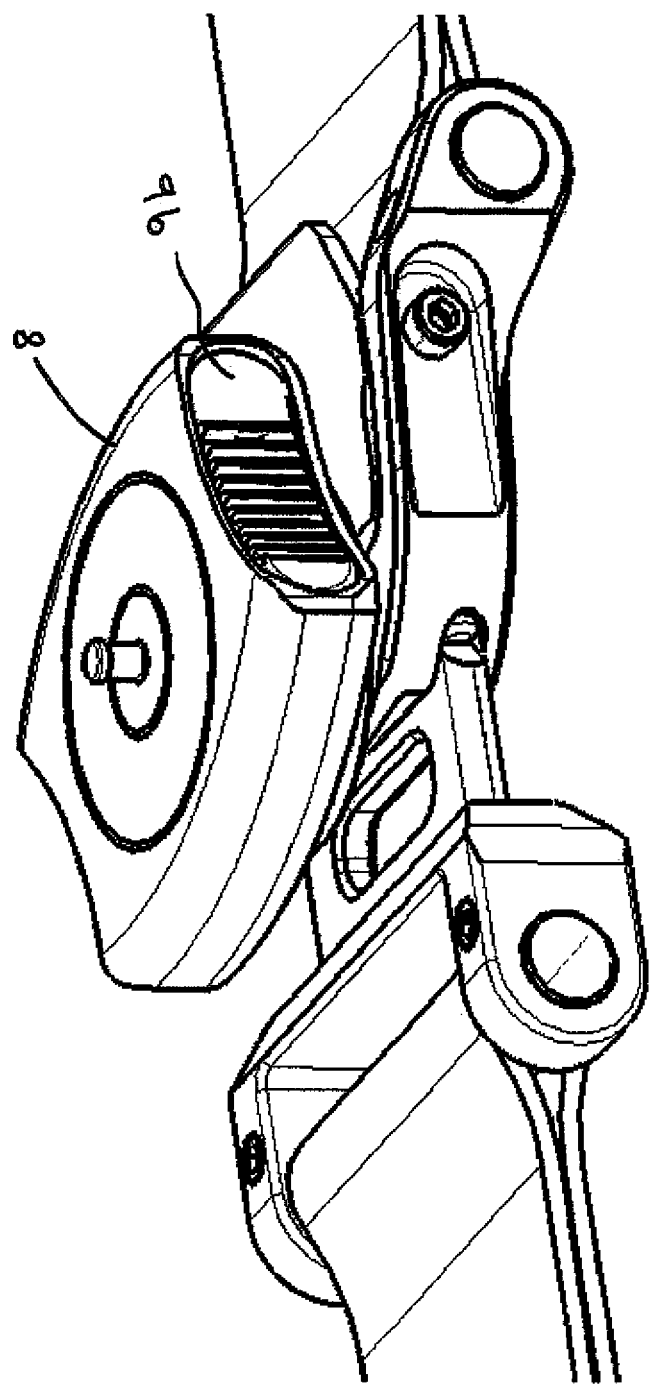
FIG. 6a shows a buckle assembly embodying the present invention during the detachment/attachment operation of the lug and socket arrangement.
Figure 6B:
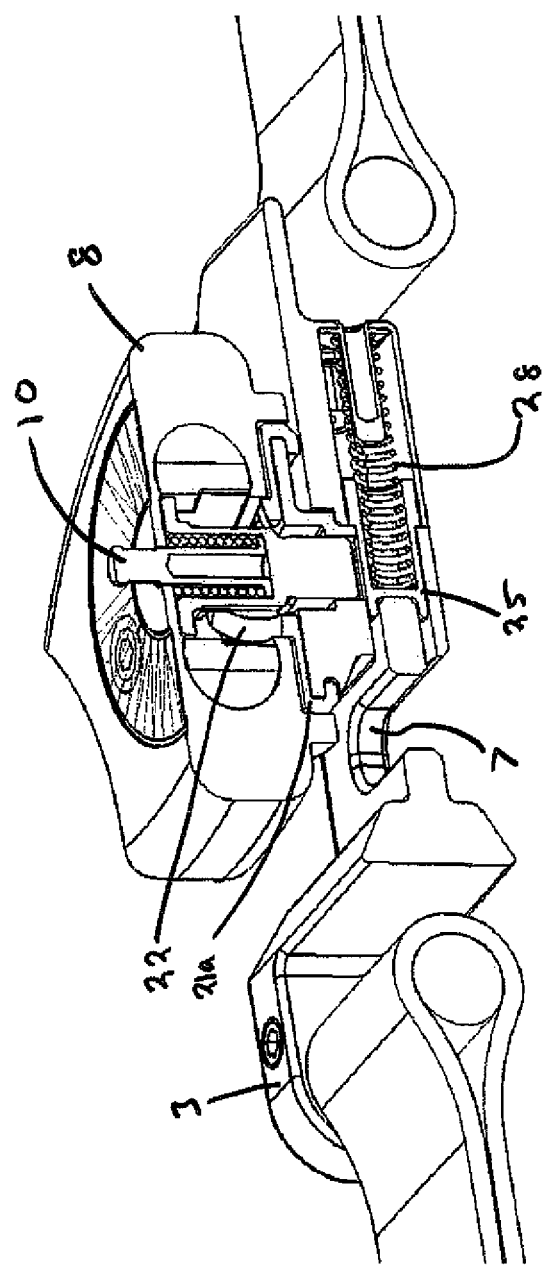

As the operating handle 8 is rotated with respect to the socket arrangement 2, the cam plates 21a, 21b (by their connection to the housing 11 of the operating handle 8), are also caused to rotate about the rotational axis 12. In turn, since the locking plunger 13 is restrained to translation within the locking channel 17, the cam followers ride up the cam surfaces 22 of the cam plates 21a, 21b. As a result, the locking plunger 13 is caused to translate linearly, towards the operating handle 8. By rotating the operating handle 8 with respect to the socket arrangement 2 by a predetermined angle, the locking bolt 18 no longer engages the aperture 7 of the lug 3 and the lug 3 is free to be disconnected from the socket arrangement 2 (FIG. 4b). The configuration of the assembly as a whole at this point is shown in FIGS. 6a and 6b.

As the locking plunger 13 translates linearly towards the operating handle 8, the indicator 10 is caused to protrude from the housing 11 of the operating handle 8, visually indicating that the locking bolt 18 is no longer securely retained within the aperture 7 in the lug 3.

Figure 3A:
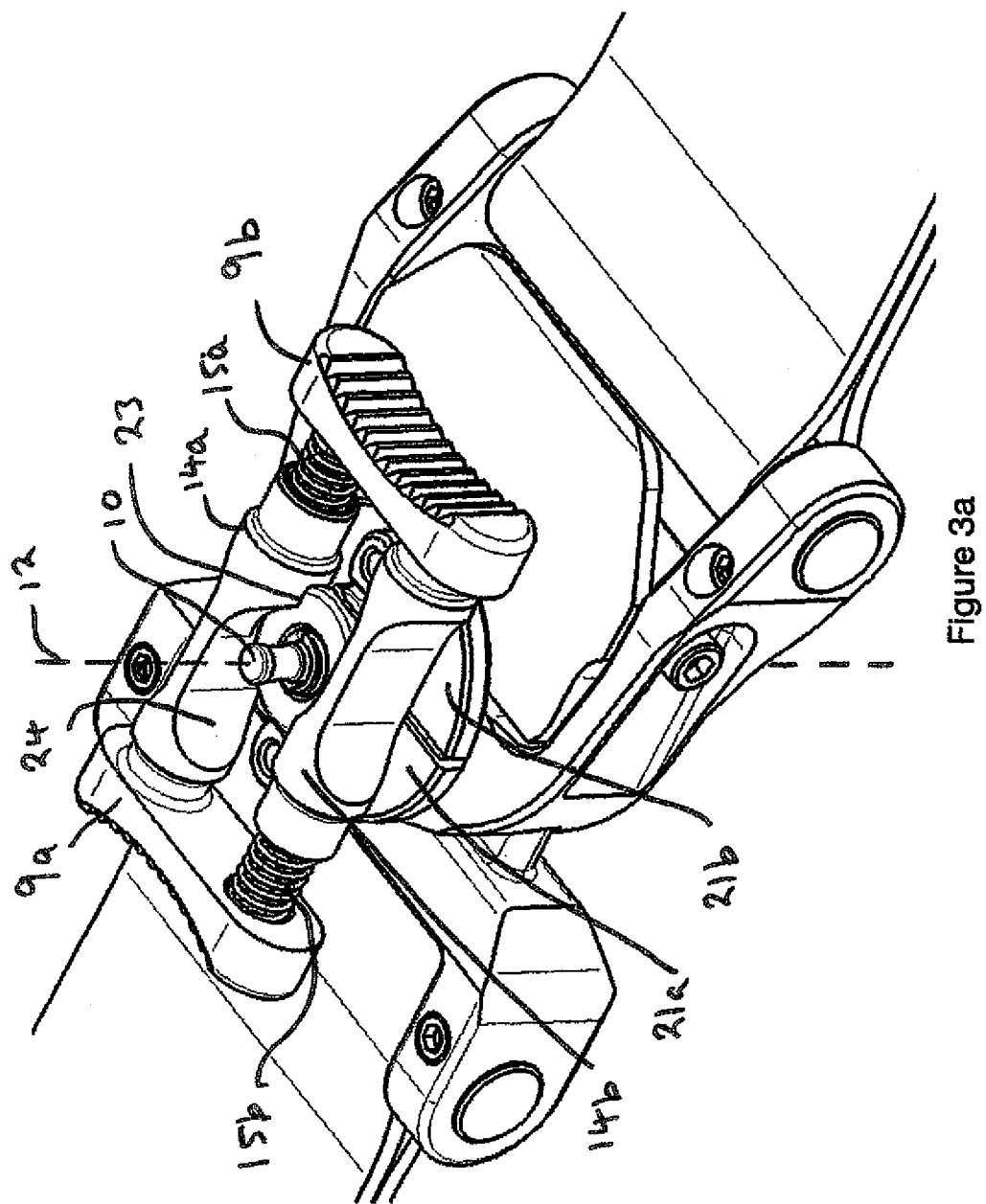
FIG. 3a shows a part of the buckle assembly embodying the present invention with the housing of the operating handle removed.

With reference to FIG. 3a, each of the blocking members 14a, 14b attached to the first and second buttons 9a, 9b comprises a mechanical stop 23, seen in more detail in FIG. 3b. When the first 9a and second 9b buttons are urged away from one another by the buttons springs 15, the mechanical stops 23—in the form of a lip—are caused to abut against the upper surface of the locking plunger 13. As a result, linear translation of the locking plunger 13 towards the operating handle 8 is prevented by the mechanical stops 23. Only when both of the first 9a and second 9b buttons are simultaneously depressed will the mechanical stops 23 be moved away from the upper surface of the locking plunger 13, to allow linear translation of the locking plunger 13. As a result, by preventing the linear translation of the locking plunger 13, the cam followers 19 of the locking plunger 13 cannot ride up the cam surface 22 of the cam plate 21a, 21b. The operating handle 8 cannot therefore be rotated with respect to the socket arrangement 2.

A benefit of the present invention is that the lug 3 is only released from the socket arrangement 2 by simultaneously depressing both the first 9a and second 9b buttons and rotating the operating handle 8 with respect to the socket arrangement 2. The need for both simultaneous and independent linear and rotational movement prevents or reduces inadvertent operation of the buckle assembly 1.

A further advantage of the provision of mechanical stops 23 on the blocking members 14a, 14b is that any excessive acceleration (g) forces imparted on the locking plunger 13 along the axis 12 in use will not cause inadvertent release of the lug 3 from the socket arrangement 2.

In the arrangement shown in FIG. 3, the first 9a and second 9b buttons need only be simultaneously depressed during the initial stages of rotation of the operating handle 8 with respect to the socket arrangement 2. Once the mechanical stops 23 of the blocking members 14 have moved away from the upper surface of the locking plunger 13, the locking plunger 13 can translate upwards (in the direction shown in FIG. 3). At this point, the first 9a and second 9b buttons can be released and the operating handle 8 further rotated with respect to the socket arrangement 2 to fully disengage the locking plunger 13 from the lug 3. When the first 9a and second 9b buttons are depressed, the locking plunger 13 is free to translate between cut-outs 24 provided on the blocking members 14.

In another embodiment, not shown, the buckle assembly 1 is configured such that the first 9a and second 9b buttons must be simultaneously depressed throughout the entire rotational movement of the operating handle 8 with respect to the socket arrangement 2 (i.e. not just the initial rotation). In such an embodiment, the first 9a and second 9b buttons could be associated with a clutch mechanism which prevents further rotation of the operating handle with respect to the socket arrangement unless both of the first 9a and second 9b buttons are depressed.

The socket arrangement 2 comprises a lug 25 plunger which is linearly translatable in a lug channel 26 in the armature 16. One end of the lug channel 26 comprises a mouth 27 for receiving the tongue 6 of the lug 3 in use. The lug plunger 25 is biased towards the mouth 27 of the lug channel 26 by a lug spring 28.

Upon insertion of the lug 3 into the lug channel 26, the insertion force must overcome the bias force of the lug spring 28, to cause the lug plunger 25 to translate with respect to the lug channel 26. As the lug 3 is inserted into the lug channel 26, the locking bolt 18 of the locking plunger 13 is caused to engage the aperture 7 of the lug 3, by the locking spring 20 force, to securely retain the lug. A benefit of the continuous bias force of the lug spring 26 is that the engaged locking bolt 18 is urged against the side of the aperture 7 in the lug 3, preventing the arrangement from rattling (i.e. providing a loose connection).

When the lug 3 is released from the socket arrangement 2, the locking bolt 18 disengages the aperture 7 in the lug 3, and the force of the lug spring 28 causes the lug plunger 25 to push the lug 3 out of the lug channel 26 and out of the socket arrangement 2. This helps in the release of the lug 3 from the socket arrangement 2, as it provides a positive disconnection of the two parts.

As the lug plunger 25 translates towards the mouth 27 of the lug channel 26, and as the tongue 6 of the lug 3 leaves the lug channel 26, the lug plunger 25 serves to block the locking plunger 13 from translating away from the operating handle 8 under the force of the locking spring 20. The end of the locking bolt 18 therefore abuts against the side of the lug plunger 25. This arrangement is shown in FIGS. 4b, 5a, 6a and 6b.

Figure 5A:
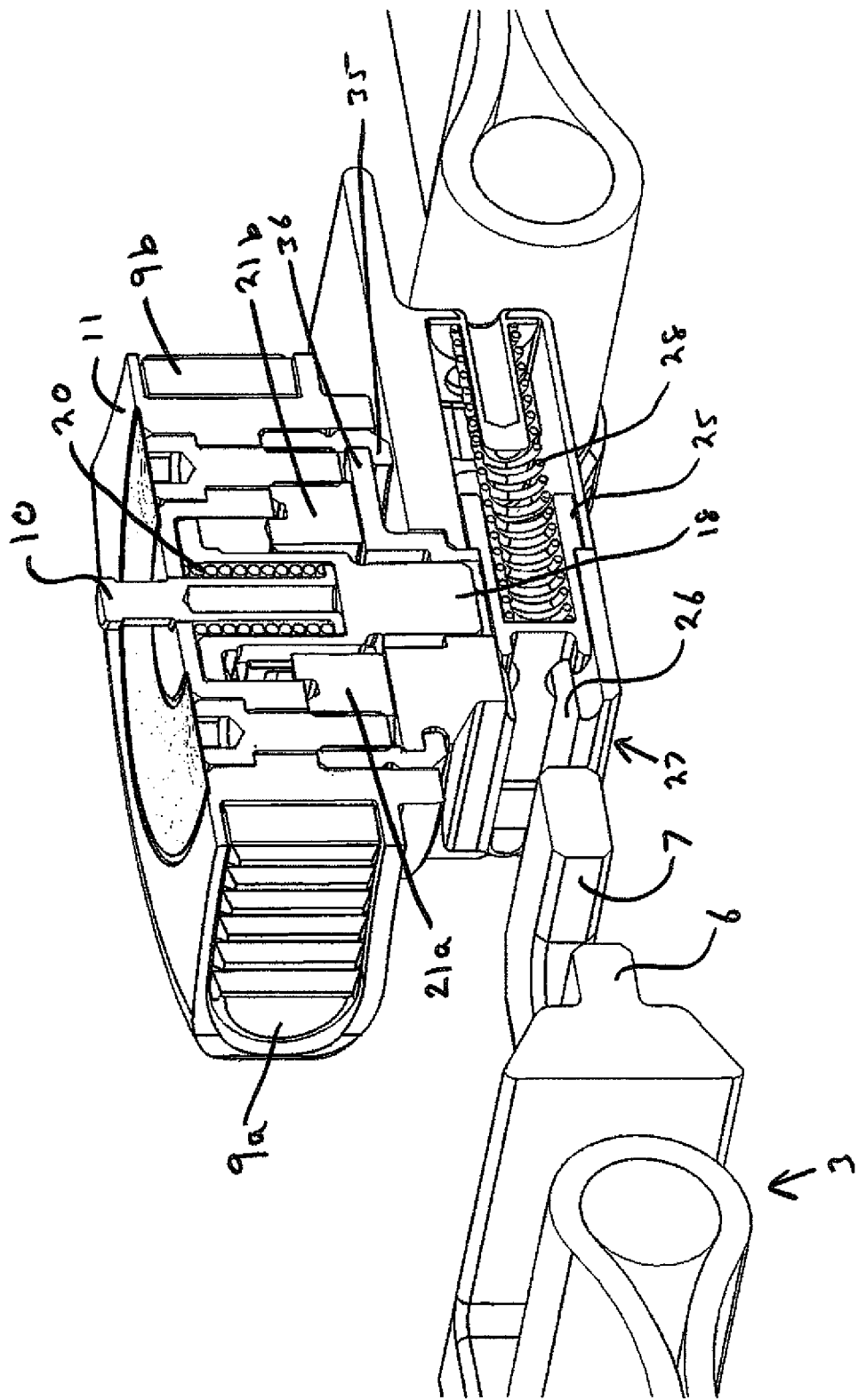
FIG. 5a shows a cross-sectional view of the arrangement shown in FIG. 1.
Figure 5B:
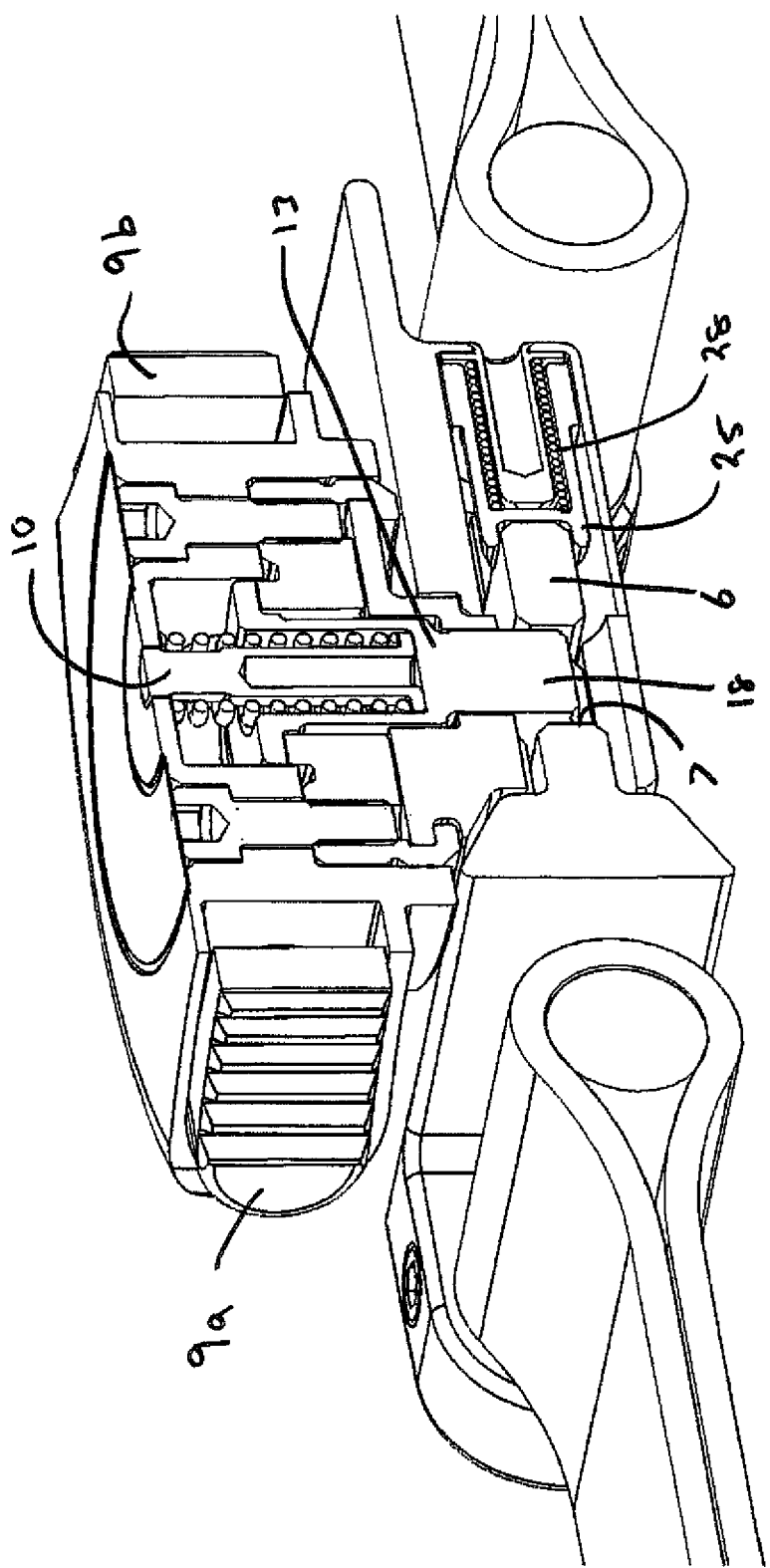
FIG. 5b shows a cross-sectional view of the arrangement shown in FIG. 2.

As the lug 3 is inserted into the mouth 27 of the lug channel 26, the lug plunger 25 is caused to translate away from the mouth 27, which in turn causes the locking bolt 18 to engage with the aperture 7 of the tongue 6. The force of the locking spring 20 causes the cam follower 19 to ride back down the cam surface 22 of the cam plate 21a, 21b. As a result, the operating handle 8 rotates back to the position shown in FIGS. 2 and 5b. As the locking plunger 13 engages with the lug, the biasing force of the button springs 15 cause the mechanical stops 23 in the blocking members 14 to re-engage with the upper surface of the locking plunger 13. As a result, the first 9a and second 9b buttons protrude from the housing 11 of the operating handle 8. Finally, the indicator is recessed into the housing 11 of the operating handle 8.

Preferably, the buckle assembly is operable one-handed, by a pilot when under an acceleration force of 2g.

In the embodiment shown, the buckle assembly is used to releasably retain a single lug. It will be appreciated that the socket arrangement could alternatively releasably retain a plurality of lugs. The buckle arrangement of the present invention is therefore suitable for multi-point harness arrangements as well as in connecting two webbing straps together.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:
1. A buckle assembly comprising:
   a socket arrangement for releasably retaining at least one lug;
   an operating handle rotatably mounted with respect to the socket arrangement and configured such that, upon rota- tion of the operating handle about an axis of rotation the lug is released from the socket arrangement, the operating handle comprising first and second buttons diametrically opposed from one another, configured such that rotation of the operating handle with respect to the socket arrangement is prevented unless both the first and second buttons are simultaneously depressed wherein the socket arrangement comprises a locking plunger mounted for linear translation along the axis of rotation and biased away from the operating handle to engage, in use, an aperture in the lug, to releasably retain the lug in the socket arrangement, and wherein the locking plunger is prevented from linear translation towards the operating handle unless both the first and second buttons are simultaneously depressed; and, the first and second buttons are attached to a respective blocking member, each blocking member comprising a mechanical stop which engages with the locking plunger to prevent linear translation of the locking plunger unless the first and second buttons are simultaneously depressed.

2. A buckle assembly according to claim 1, wherein the first and second buttons are linearly translatable towards one another along the same plane.

3. A buckle assembly according to claim 2, wherein the plane is substantially perpendicular to the axis of rotation.

4. A buckle assembly according to claim 1, wherein the first and second buttons are biased away from one another.

5. A buckle assembly according to claim 1, wherein rotation of the operating handle with respect to the socket arrangement causes the locking plunger to translate along the axis toward the operating handle, and out of engagement with the aperture in the lug.

6. A buckle assembly according to claim 1, wherein the operating handle comprises at least one cam plate and the locking plunger comprises at least one cam follower, configured such that rotation of the operating handle with respect to the locking plunger causes the cam follower to ride up along a cam surface of the cam plate and for the locking plunger to translate along the axis, towards the operating handle.

7. A buckle assembly according to claim 1, further comprising an indicator for visually indicating linear translation of the locking plunger with respect to the operating handle.

8. A buckle assembly according to claim 7, wherein the indicator is associated with the locking plunger and protrudes from the operating handle upon linear translation of the locking plunger towards the operating handle.

9. A buckle assembly according to claim 1, wherein the socket arrangement further comprises a lug plunger biased towards a mouth of the socket arrangement and thus against insertion of the lug into the socket arrangement.

10. A buckle assembly according to claim 9, configured such that, upon removal of the lug from the mouth of the socket arrangement, the lug plunger is urged towards the mouth so as to prevent translation of the locking plunger away from the operating handle.

11. A buckle assembly according to claim 9, configured such that, upon insertion of a lug into the mouth of the socket arrangement, the lug plunger is caused to translate against its bias until the locking plunger is allowed to translate away from the operating handle and into engagement with the aperture of the lug.

12. A buckle assembly according to claim 1, wherein the centre of gravity of the operating handle lies along the axis of rotation.

13. A buckle assembly according to claim 1, wherein the centre of gravity of the first and second buttons lies along the axis of rotation.

14. A buckle assembly according to claim 1, wherein the first and second buttons are configured such that, when fully depressed, they do not protrude from the operating handle.

15. A buckle assembly according to claim 1, further including a lug.

* * * * *